(12) United States Patent
Takemura

(10) Patent No.: US 6,170,753 B1
(45) Date of Patent: Jan. 9, 2001

(54) CARD READER

(75) Inventor: Hisao Takemura, Kawasaki (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/190,222

(22) Filed: Nov. 13, 1998

(30) Foreign Application Priority Data

Nov. 13, 1997 (JP) .................................................. 9-312340

(51) Int. Cl.7 ...................................................... G06K 7/00
(52) U.S. Cl. ........................................... 235/486; 235/380
(58) Field of Search ..................................... 235/441, 380, 235/375, 492, 487, 483, 484, 485, 486

(56) References Cited

U.S. PATENT DOCUMENTS

| 5,015,830 | * | 5/1991 | Masuzawa et al. | 235/441 |
| 5,272,319 | * | 12/1993 | Rey | 235/379 |
| 5,402,095 | * | 3/1995 | Janniere | 235/441 |
| 5,615,250 | | 3/1997 | Kobayashi | 379/61 |
| 6,042,009 | * | 3/2000 | Barrett et al. | 235/441 |

FOREIGN PATENT DOCUMENTS 0 533 542   3/1993 (EP) .

* cited by examiner

Primary Examiner—Karl D. Frech
(74) Attorney, Agent, or Firm—Pillsbury Madison & Sutro LLP

(57) ABSTRACT

A card reader for reading the data recorded in an IC card comprises a front case having a substrate and an inner panel mounted thereto, and a rear case detachably mounted to the front case. A plurality of claws, which can be engaged with each other, are formed at the peripheral portions of the front case and the rear case so as to permit the rear case to be detachable from the front case. The particular construction makes it possible to renew batteries and to wash contact pins forming contact points with the IC card.

15 Claims, 4 Drawing Sheets

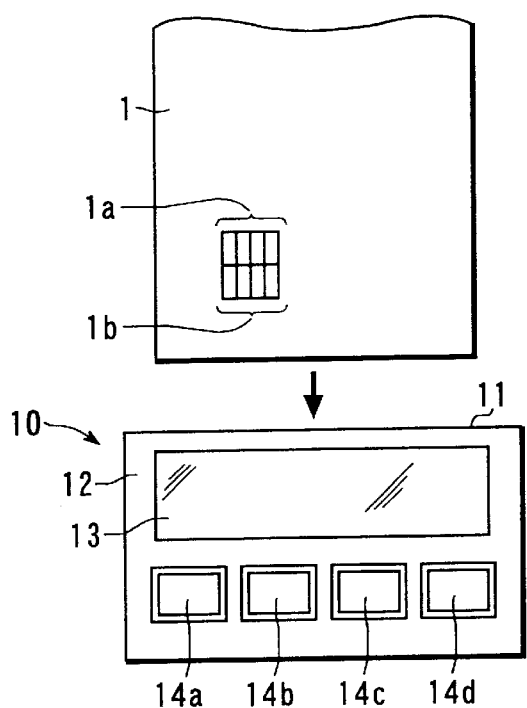 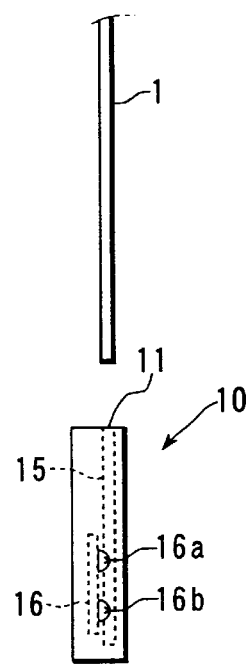
FIG. 1A    FIG. 1B
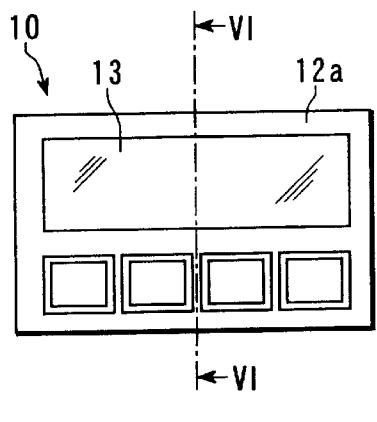 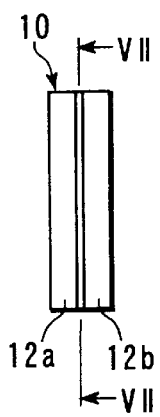 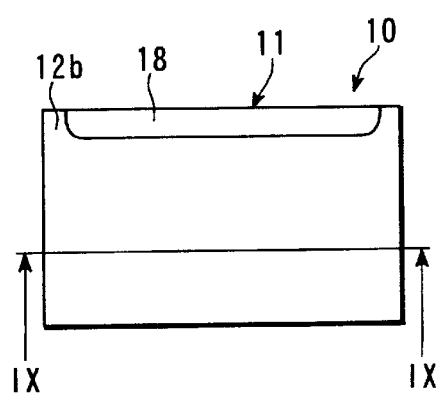
FIG. 2A    FIG. 2B    FIG. 2C

CARD READER

BACKGROUND OF THE INVENTION

The present invention relates to a card reader which receives an IC card, reads data recorded on the IC card, and displays the data read out of the IC card.

In recent years, a small card reader excellent in portability and used as a personal terminal equipment in the electronic commercial transaction is being developed as a card reader for reading out data recorded in an IC card.

A portable card reader of this type is being simplified in construction and performance in an attempt to lower the manufacturing cost. When it comes to, for example, the construction, the portable card reader consists of only a casing of an IC card and a substrate. Mounted on the substrate are, for example, electronic parts, an LCD (liquid crystal display device), a battery and contacts with the IC card. The casing is mounted to surround the substrate.

In the card reader of the simplified construction described above, a battery for driving the card reader is soldered to the substrate and, thus, cannot be detached from the apparatus body. Therefore, the apparatus itself must be discarded with expiration of the battery life, even if the card reader is capable of performing the normal function. Also, the battery must be disposed of together with the apparatus body with expiration of the battery life, giving rise to a serious environmental problem.

BRIEF SUMMARY OF THE INVENTION

An object of the present invention, which has been achieved in view of the situation described above, is to provide a card reader which permits renewing a battery and also permits stably ensuring an electrical contact with an IC card.

According to an aspect of the present invention, there is provided a card reader, comprising:

a receiving section for receiving an IC card;

reading means for reading data from the IC card received in the receiving section;

a battery for driving the reading means;

a front case housing the reading means and the battery;

an inner panel mounted to the front case, serving to detachably hold the battery housed in the front case, and guiding the IC card into the receiving section; and a rear case detachably mounted to the front case such that the receiving section is defined between the inner panel and the rear case.

According to another aspect of the present invention, there is provided a card reader, comprising:

a receiving section for receiving an IC card having data recorded thereon;

a contact which is connected to the IC card received in the receiving section;

reading means for reading data from the IC card received in the receiving section via the contact;

a battery for driving the reading means;

a substrate having the contact and the reading means mounted thereon;

a front case housing the substrate and the battery;

an inner panel mounted to the front case, having a stopper portion serving to detachably hold the battery housed in the front case and a guide surface apart from the front case and facing the receiving section, protecting the substrate, and guiding the IC card along the guide surface into the receiving section; and a rear case detachably mounted to the front case such that the receiving section is defined between the guide surface of the inner panel and the rear case.

Further, according to still another aspect of the present invention, there is provided a card reader, comprising:

a receiving section for receiving an IC card having various data recorded thereon;

a contact which is connected to the IC card received in the receiving section;

signal processing means for reading the data recorded on the IC card via the contact so as to prepare data to be displayed;

display means for displaying the data prepared by the signal processing means;

a battery for driving the signal processing means and the display means;

a substrate having the contact, the signal processing means and the display means mounted thereon;

a front case housing the battery and the substrate;

an inner panel mounted to the front case, having a stopper section serving to detachably hold the battery housed in the front case and a guide plane apart from the front case and facing the receiving section, protecting the substrate, and guiding the IC card along the guide plane into the receiving section; and a rear case detachably mounted to the front case such that the receiving section is defined between the guide plane of the inner panel and the rear case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1A is a front view showing a card reader according to the present invention and an IC card;

FIG. 1B is a side view showing the card reader and the IC card shown in FIG. 1A;

FIG. 2A is a front view of the card reader shown in FIG. 1A;

FIG. 2B is a side view of the card reader shown in FIG. 1A;

FIG. 2C is a back view of the card reader shown in FIG. 1A;

DETAILED DESCRIPTION OF THE INVENTION

Figure 3:
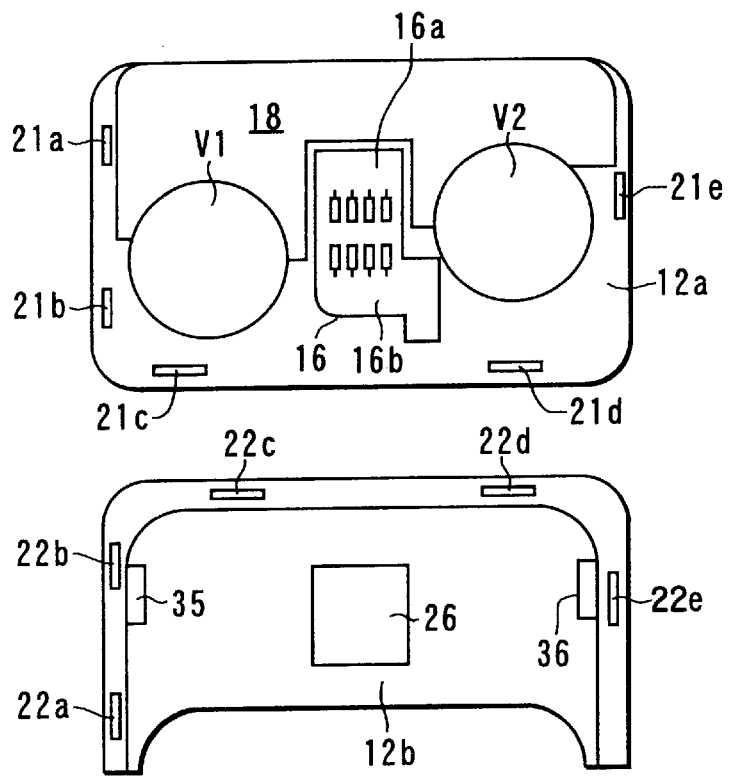
FIG. 3 shows the state that the rear case of the card reader is detached from the front case.

Let us describe a card reader according to one embodiment of the present invention with reference to the accompanying drawings.

Specifically, FIG. 1A is a front view showing an IC card 1 and a card reader 10. Also, FIG. 1B is a side view showing the IC card 1 and the card reader 10. Incidentally, the tip portion around the contact of the IC card 1 is selectively shown in the drawing.

Contact portions 1a, 1b, which are brought into contact with the card reader 10, are formed in predetermined portions on a surface of the IC card 1. Each of these contact portions 1a, 1b, which are arranged side by side in an inserting direction of the IC card denoted by an arrow, is divided into four regions in a direction perpendicular to the IC card inserting direction.

The card reader 10 comprises a substantially rectangular case 12 made of resin. A slit-like card insertion hole 11 for inserting the IC card 1 is formed in an upper end portion of the case 12. A window 13 for observing a liquid crystal display (LCD) panel displaying various data read from the IC card 1 and a plurality of switching buttons 14a to 14d for selectively switching the data, which are to be displayed on the LCD panel, are mounted on the front surface of the case 12.

A card slot 15 extending downward from the card insertion hole 11 is formed inside the case 12. Also, the card reader 10 is equipped with contact pins 16a, 16b which are connected to the contact portions 1a, 1b of the IC card 1 when the IC card 1 is inserted to reach a predetermined position within the card slot 15. These contact pins 16a, 16b are mounted side by side on a contact block 16 so as to be exposed to the card slot 15. Incidentally, each of the contact pins 16a, 16b is also divided into four regions to conform with the divided regions of the contact portions 1a, 1b of the IC card.

FIGS. 2A, 2B and 2C are a front view, a side view and a back view, respectively, of the card reader 10. The case 12 of the card reader 10 includes a front case 12a and a rear case 12b detachably mounted to the front case 12a. A substrate having various electronic parts mounted thereon together with the LCD panel and the contact block 16 is housed in the front case 12a. Also, a resin inner plate 18 is fastened by a screw to the front case 12a in a manner to cover the substrate. The card slot 15 is formed between the inner plate 18 and the rear case 12b.

Figure 4:
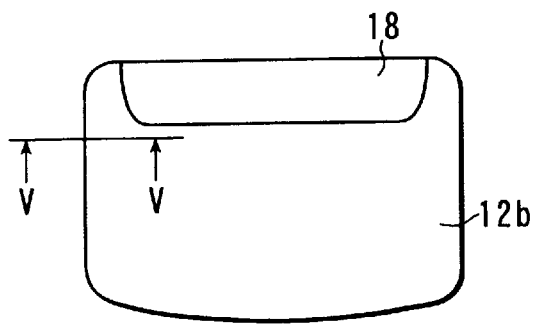
FIG. 4 shows the assembled state of the card reader shown FIG. 3.
Figure 5:
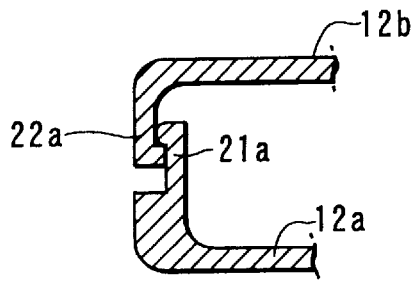
FIG. 5 is a cross sectional view along the line V—V shown in FIG. 4.

Let us describe how the rear case 12b is mounted to and detached from the front case 12a with reference FIGS. 3 to 5.

As shown in FIG. 3, claws 21a to 21e and 22a to 22e, which are engaged with each other, are formed on the peripheral portions of the front case 12a and the rear case 12b, respectively, i.e., peripheral portions except the upper end portion in which the card insertion hole 11 is formed. If the rear case 12b is mounted to the front case 12a as shown in FIG. 4, the claw 21a of the front case 12a is engaged with the claw 22a of the rear case 12b as shown in FIG. 5. Likewise, the claws 21b to 21e of the front case 12a are engaged respectively with the claws 22b to 22e of the rear case 12b.

As described above, the rear case 12b is detachable from the front case 12a. When the rear case 12b is detached as shown in FIG. 3, it is possible to renew batteries V1 and V2 mounted in the front case 12a. Also, since the rear case 12b is detachable, it is possible to wash the contact pins 16a, 16b which are connected to the IC card 1. Further, since the batteries can be renewed, the batteries V1, V2 can be detached for the disposal from the front case 12a upon expiration of the life, and new batteries can be mounted to the front case 12a to permit the card reader 10 to be used again.

Figure 6:
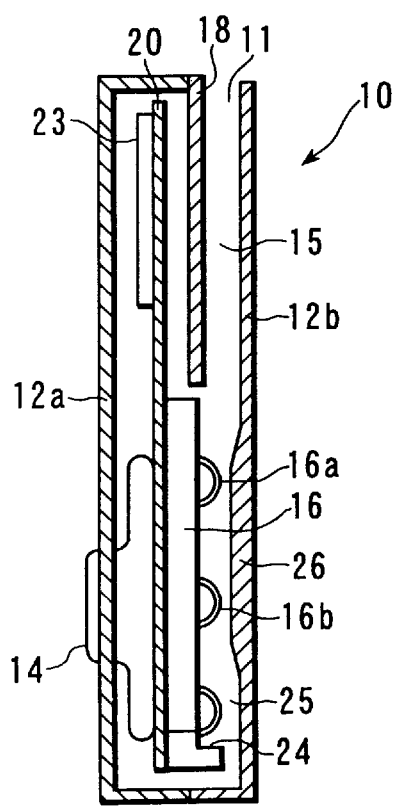
FIG. 6 is a cross sectional view along the line VI—VI shown in FIG. 2A.
Figure 8:
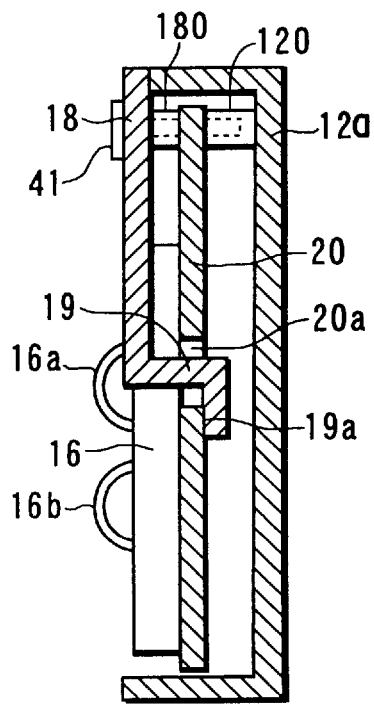
FIG. 8 is a cross sectional view along the line VIII—VIII shown in FIG. 7.
Figure 7:
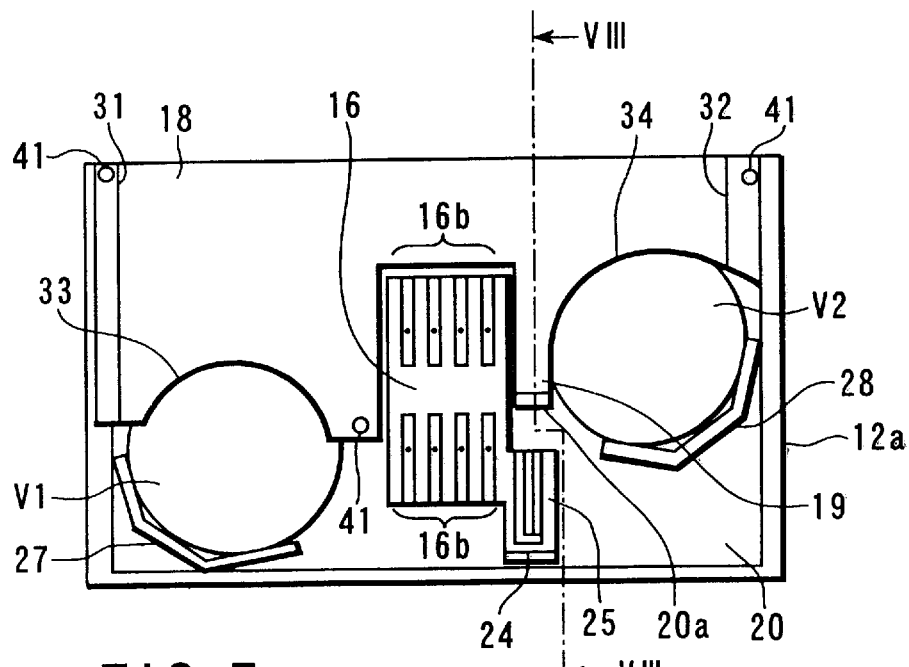
FIG. 7 shows the state that the rear case of the card reader is detached from the line VII—VII shown in FIG. 2B.
Figure 9:
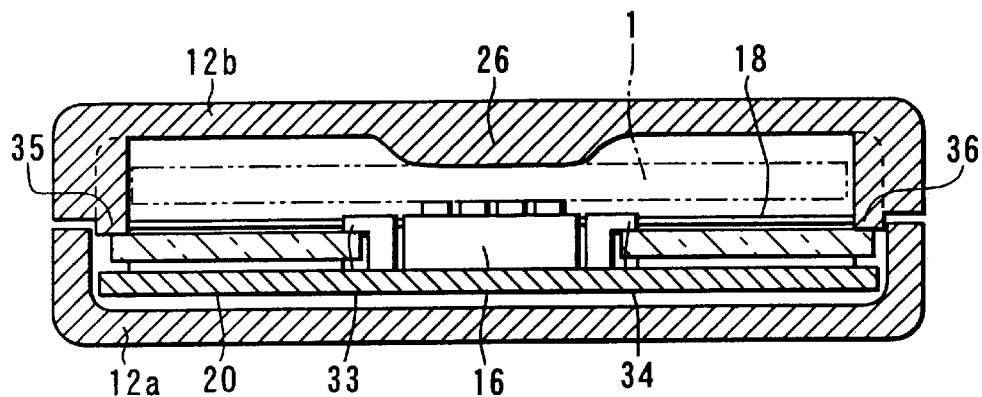
FIG. 9 is a cross sectional view along the line IX—IX shown in FIG. 2C.

The internal construction of the card reader 10 is shown in FIGS. 6 to 9. Specifically, FIG. 6 is a cross sectional along the line VI—VI shown in FIG. 2A. FIG. 7 is a cross sectional along the line VII—VII shown in FIG. 2B. FIG. 8 is a cross sectional along the line VIII—VIII shown in FIG. 7. Further, FIG. 9 is a cross sectional along the line IX—IX shown in FIG. 2C.

As shown in FIG. 6, a substrate 20 is incorporated inside the front case 12a of the card reader 10. Mounted on the substrate 20 are an LCD panel 23 for displaying the data recorded in the IC card 1, the switching buttons 14a to 14d exposed on the front side of the front panel 12a, and the contact block 16 supporting the contact pins 16a, 16b. Also, a card stopper 24 is fixed to the substrate 20. When the IC card 1 is inserted into a card slot 15 through the card insertion hole 11, the tip portion of the IC card 1 is engaged with the card stopper 24 so as to hold the IC card 1 at a predetermined position.

Further, a contact switch 25 is arranged in the vicinity of the card stopper 24. When the IC card 1 is inserted into a predetermined position so as to have the tip of the IC card 1 engaged with the card stopper 24, the contact switch 25 is turned on. To be more specific, if the IC card 1 is inserted into the card slot 15 through the card insertion hole 11 so as to have the tip of the IC card engaged with the card stopper 24, the contact switch 25 is turned on so as to start reading of the data recorded in the IC card 1.

A convex portion 26 for pushing the inserted IC card 1 toward the contact pins 16a, 16b is formed on that inner surface of the rear case 12b of the card reader 10 which faces the card slot 15. The convex portion 26 is positioned to face the contact block 16 mounted to the substrate 20. In order to facilitate the insertion of the IC card 1 into the card slot 15, the end portions of the convex portion 26 are moderately inclined. As apparent from the drawing, the convex portion 26 permits the contact portions 1a, 1b of the IC card 1 to be pressed against the contact pins 16a, 16b so as to ensure contact between the contact portions 1a, 1b and the contact pins 16a, 16b.

As shown in FIGS. 7 and 8, an inner panel 18 is mounted between the front case 12a and the rear case 12b of the card reader 10. The inner panel 18 serves to protect the substrate 20 housed in the front case 12a and to guide the IC card 1 into the card slot 15.

The inner panel 18 is fastened to the front case 12a by screws 41 at three points shown in FIG. 7. As shown in FIG. 8, the screw 41 is inserted from the rear side through the inner panel 18, a sleeve 180 projecting from the inner panel 18, and the substrate 20 so as to be engaged with a sleeve 120 projecting from the front case 12a.

Formed on the inner panel 18 are insertion guides 31, 32 for guiding the insertion of the IC card into the card reader 10 and battery stopper sections 33, 34 for preventing the batteries V1, V2 mounted to the substrate 20 from floating up. Springs 27, 28 are mounted to the front care 12a to permit the batteries V1, V2 to be detachable from the substrate 20. Also, the battery stopper sections 33, 34 of the inner panel 18 are shaped arcuate so as to permit the batteries V1, V2 to be mounted to and detached from the substrate 20 easily.

To be more specific, the batteries V1, V2 are partially held by the arcuate end portions of the battery stopper sections 33, 34 and are kept urged by the springs 27, 28 toward the battery stopper sections 33, 34. It follows that the batteries V1, V2 can be mounted to and detached from the substrate 20 against the urging force of the springs 27, 28 so as to facilitate the battery renewal.

Further, a projection 19 projecting toward the substrate 20 is formed on the inner panel 18. The projection 19 is positioned in the vicinity of the contact block 16, and the tip portion of the projection 19 is bent in substantially an L-shape on the front side of the substrate 20 such that the tip of the projection 19 is engaged with the front surface of the substrate 20. Incidentally, the substrate 20 is provided with a hole 20a through which the tip portion of the projection 19 is inserted.

It should be noted that the projection 19 of the inner panel 18 which is formed in the vicinity of the contact block 16 serves to prevent the distance between the inner panel 18 and the substrate 20 from being increased, making it possible to maintain parallelism between the contact block 16 and the inner panel 18 in spite of deformation caused by, for example, warping of the substrate 20. It follows that the IC card 1 guided along the inner panel 18 is stably maintained parallel with the contact block 16 so as to ensure the contact between the two with a high stability.

As shown in FIGS. 3 and 9, the rear case 12b is provided with the battery stoppers 35, 36 serving to prevent the batteries VI, V2 mounted to the front case 12a from floating up. These battery stoppers 35, 36 are positioned away from the card slot 15 so as not to inhibit the IC card insertion. As a result, the batteries V1, V2 are fixed at predetermined positions without fail under the condition that the rear case 12b is mounted to the front case 12a.

Figure 10:
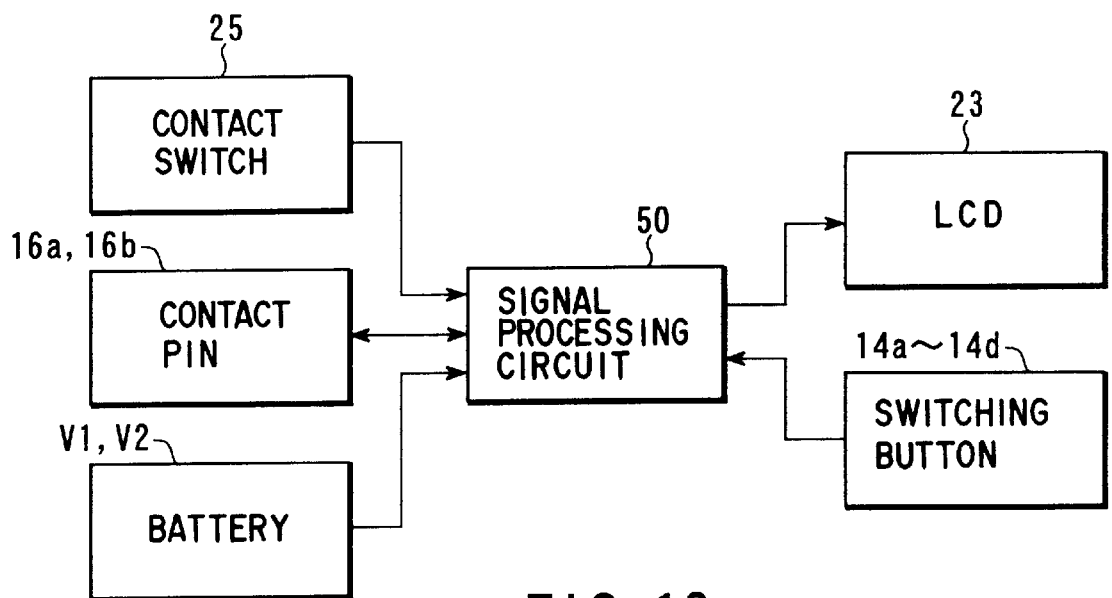
FIG. 10 is a block diagram showing the control system of the card reader.

FIG. 10 is a block diagram showing the control system of the card reader 10 of the construction described above. As shown in the drawing, the control system of the card reader 10 comprises a signal processing circuit 50 for processing the data read from the IC card 1. Connected to the signal processing circuit 50 are the contact switch 25 which is turned on upon insertion of the IC card, the contact pins 16a, 16b connected to the contact portions 1a, 1b of the IC card, the batteries V1, V2 acting as driving power sources, the LCD panel 23 for displaying the data recorded in the IC card, and the switching buttons 14a to 14d for selectively displaying the data on the LCD panel 23.

If the tip of the IC card 1 inserted through the card insertion hole 11 is engaged with the card stopper 24, the contact switch 25 is turned on so as to start reading of the data recorded in the IC card 1. The data read from the IC card 1 are processed in the signal processing circuit 50 so as to prepare a plurality of data to be displayed. The data thus prepared are selectively displayed on the LCD panel 23 in accordance with depression of any of the switching buttons 14a to 14d.

The present invention is not limited to the embodiment described above. Various modifications are available within the technical scope of the present invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card reader, comprising:
   a receiving section for receiving an IC card;
   reading means for reading data from the IC card received in said receiving section;
   a battery for driving said reading means;
   a front case housing said reading means and said battery;
   an inner panel mounted to said front case housing, serving to detachably hold the battery housed in the front case, and guiding the IC card into said receiving section; and
   a rear case detachably mounted to the front case such that the receiving section is defined between said inner panel and said rear case,
   wherein said rear case is provided with a convex portion projecting toward said receiving section so as to hold the IC card received in the receiving section, and
   wherein said convex portion includes inclined end portions effective for facilitating the insertion and withdrawal of said IC card into and out of said receiving section.

2. The card reader according to claim 1, wherein said rear case is provided with a stopper section for holding the battery housed in said front case under the condition that the rear case is mounted to the front case.

3. A card reader, comprising:
   a receiving section for receiving an IC card having data recorded thereon;
   a contact which is connected to the IC card received in said receiving section;
   reading means for reading data from the IC card received in said receiving section via said contact;
   a battery for driving said reading means;
   a substrate having said contact and said reading means mounted thereon;
   a front case housing said substrate and said battery;
   an inner panel mounted to said front case, said inner panel including a guide surface apart from said front case, facing said receiving section, protecting said substrate, and guiding the IC card into said receiving section, and a stopper portion pushing part of the battery to detachably hold the battery housed in the front case; and
   a rear case detachably mounted to the front case such that the receiving section is defined between said guide surface of the inner panel and said rear case, said rear case covering the contact and portions of the battery which are other than the part pushed by the stopper portion.

4. The card reader according to claim 3, wherein said rear case is provided with a stopper section effective for holding the battery housed in said front case under the condition that the rear case is mounted to the front case.

5. The card reader according to claim 3, wherein said rear case is provided with a convex portion projecting toward said receiving section so as to push the IC card received in said receiving section toward said contact.

6. The card reader according to claim 5, wherein said convex portion includes moderately inclined end portions effective for facilitating the insertion and withdrawal of the IC card into and out of said receiving section.

7. The card reader according to claim 6, wherein said convex portion is positioned to face said contact under the condition that the rear case is mounted to the front case.

8. The card reader according to claim 3, wherein said inner panel is fixed to said front case and is provided with a projection for supporting the substrate to maintain parallelism between the inner panel and the substrate.

9. The card reader according to claim 8, wherein said projection is positioned in the vicinity of said contact.

10. The card reader according to claim 3, wherein guide portions for guiding the end portions of the IC card in inserting the IC card into said receiving section are formed in a protruding fashion on the guide surface of said inner panel.

11. The card reader according to claim 3, wherein said stopper portion of the inner panel includes an arcuate portion for partially holding said battery, and said front panel is provided with urging member for urging the battery toward said arcuate portion.

12. A card comprising:
   a receiving section for receiving an IC card having various data recorded thereon;
   a contact which is connected to the IC card received in said receiving section;
   signal processing means for reading the data recorded on the IC card via said contact so as to prepare data to be displayed;
   display means for displaying the data prepared by said signal processing means;
   a battery for driving said signal processing means and said display means;
   a substrate including said contact, said signal processing means and said display means mounted thereon;
   a front case housing said battery and said substrate;
   an inner panel mounted to said front case, said inner panel including a guide surface apart from said front case, facing said receiving section, protecting said substrate, and guiding the IC card into said receiving section, and a stopper portion pushing part of the battery to detachably hold the battery housed in the front case; and
   a rear case detachably mounted to the front case such that the receiving section is defined between said guide surface of the inner panel and said rear case, said rear case protecting the contact and portions of the battery which are other than the part pushed by the stopper portion.

13. The card reader according to claim 12, wherein said rear case is provided with a stopper section for holding the battery housed in said front case under the condition that the rear case is mounted to the front case.

14. The card reader according to claim 12, further comprising switching buttons for selecting the data prepared in said signal processing means such that the selected data is selectively displayed on said display means.

15. The card reader according to claim 12, wherein said stopper portion of the inner panel includes an arcuate portion for partially holding said battery, and said front panel is provided with urging member for urging the battery toward said arcuate portion.

* * * * *